Sept. 27, 1932.  G. GERALDSON  1,879,181
TRACTOR CULTIVATOR
Filed Sept. 18, 1929  3 Sheets-Sheet 1

Sept. 27, 1932.  G. GERALDSON  1,879,181
TRACTOR CULTIVATOR
Filed Sept. 18, 1929  3 Sheets-Sheet 2

Inventor
GERALD GERALDSON,

By James A. Walsh,
Attorney

Sept. 27, 1932.　　　　G. GERALDSON　　　　1,879,181
TRACTOR CULTIVATOR
Filed Sept. 18, 1929　　3 Sheets-Sheet 3

Inventor
GERALD GERALDSON,
By James A. Walsh,
Attorney

Patented Sept. 27, 1932

1,879,181

UNITED STATES PATENT OFFICE

GERALD GERALDSON, OF RACINE, WISCONSIN, ASSIGNOR TO J. I. CASE COMPANY, OF RACINE, WISCONSIN, A CORPORATION

TRACTOR CULTIVATOR

Application filed September 18, 1929. Serial No. 393,376.

My invention relates to that type of agricultural machine which embodies a tractor equipped with cultivator tools and mechanism for raising and lowering them when turning at the end of a row and for avoiding obstructions in the path of the cultivators. For these purposes it has been the practice to employ a manually operated lever of the master type for controlling the cultivator gangs when raising them from and lowering them to the ground, but in practical experience I have found that when turning at the end of a row it is difficult for the operator to manipulate the tractor and the master lever simultaneously. Therefore, it becomes necessary to stop the forward movement of the tractor and direct attention only to the master lever for raising the gangs, after which the tractor cultivator is turned and the gangs then lowered to resume cultivating operations, it being necessary to again stop the tractor after being turned in order to lower the tools. It is the object of my invention to provide means whereby each gang may be individually raised and lowered, or all of the gangs simultaneously thus operated, as desired, in an expeditious manner, while at the same time steering the tractor, and also in other respects to improve a tractor cultivator.

Figure 1:
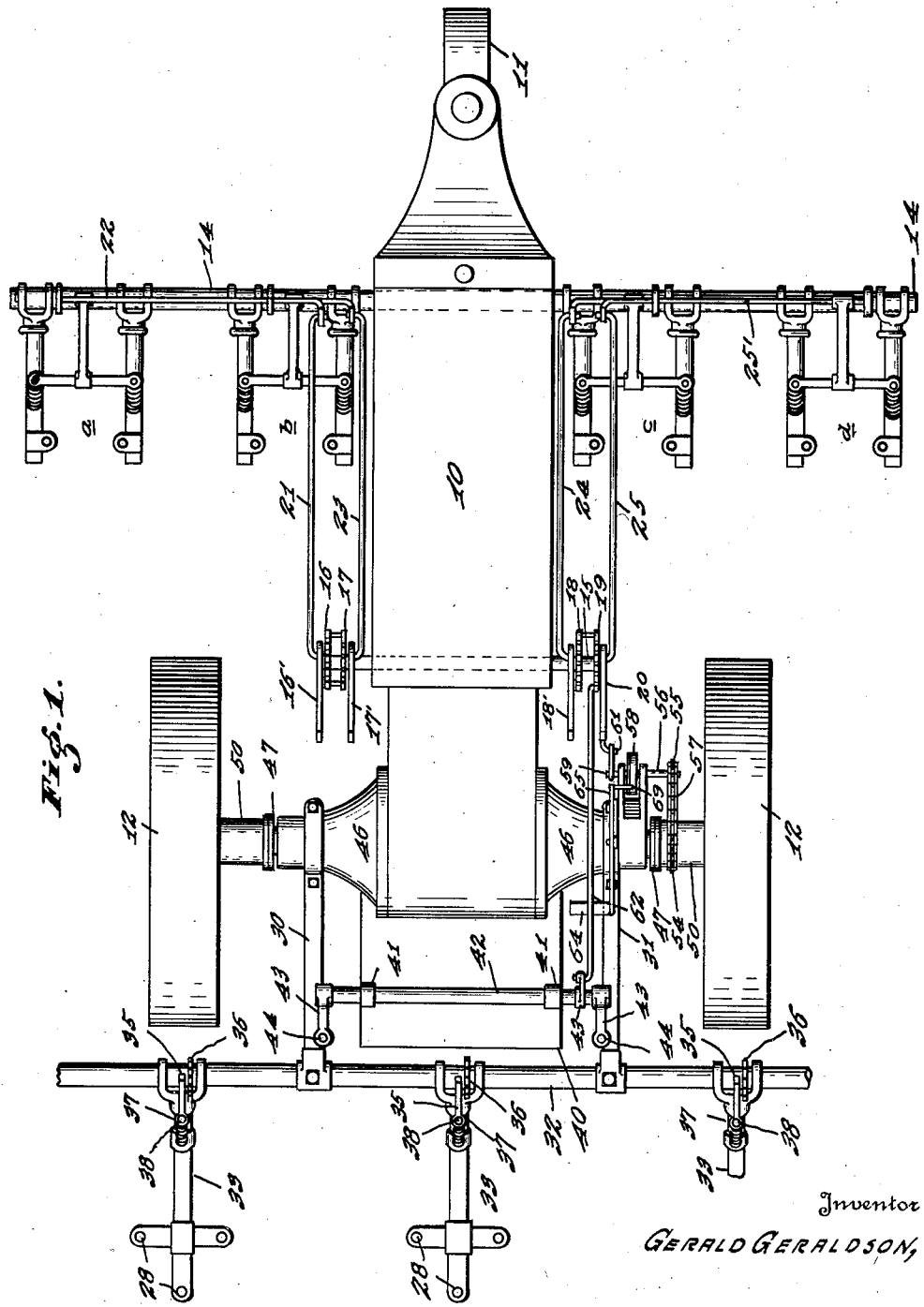
Figure 2:
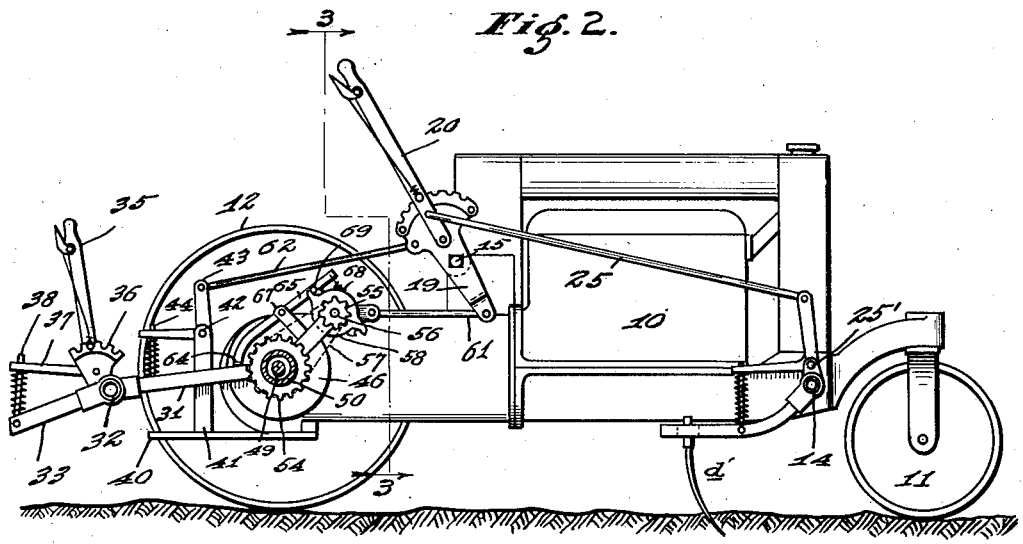
Figure 3:
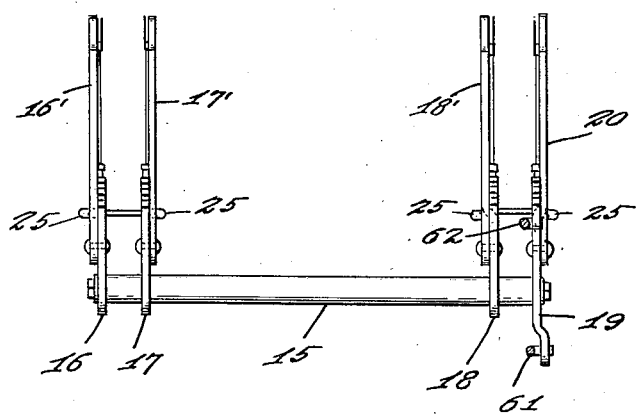
Figure 4:
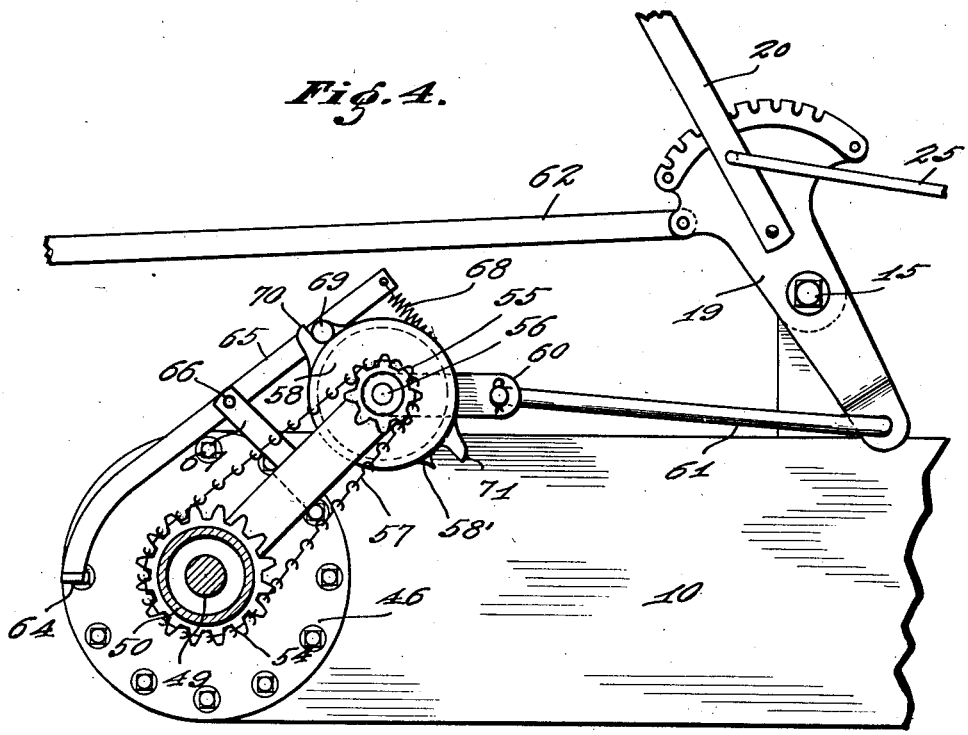

In the accompanying drawings, forming part hereof, Figure 1 is a plan view of a tractor cultivator embodying my improvements; Fig. 2, a side elevation thereof; Fig. 3, a detail section taken on the dotted line 3—3 in Fig. 2; Fig. 4, an enlarged side elevation of certain parts of the tractor and cultivating equipment, and Fig. 5 is a plan of the parts shown in Fig. 4.

In said drawings I have illustrated my improved tractor cultivator as suitable for cultivating four rows, and in which drawings the numeral 10 indicates a tractor, 11 its steering wheel, and 12 its driving wheels. At the forward end of the tractor I secure a supporting member preferably in the form of a continuous or sectional pipe or shaft 14 for the cultivator gangs a, b, c, d, indicated in Fig. 1, and which may be of any appropriate construction for carrying the cultivators or shovels d'. Mounted upon the tractor is a shaft 15 to which is secured quadrants 16, 17, 18, each having pivotally connected thereto a lever 16', 17', 18', respectively, and also on said shaft is a master quadrant 19 of somewhat different shape, to which a lever 20 is pivotally connected. The lever 16' is connected to the gang a by links 21, 22, and levers 17' and 18' connect gangs b and c by links 23, 24, respectively, while lever 20 is connected to gang d by the links 25, 25'. Each gang is pivotally connected to the support 14 so that each may be raised and lowered by proper movement of the lever controlling it, and each set to cultivate at the same or varying depths independently of the others. It will be noted that in mounting these front gangs on the supporting shaft 14 as indicated said gangs and the shovels carried thereby are positioned in the rear of the steering wheel (or wheels) 11 and forward of the driving wheels 12, and so arranged that the shovels will travel close to the rows and finely cultivate the plants.

The rear cultivators 28, which follow the wake of the wheels, can be controlled independently or collectively in a manner somewhat similar to the front gangs. It will be understood that the shovels (not shown) are mounted on the rear gangs and loosen the dirt packed by all the wheels of the tractor, so that by such shovels coarse cultivation is accomplished, while, as above stated, the front shovels, moving next to the plants, perform fine cultivation thereof. Extending rearwardly from the tractor body are supports 30, 31, in which a shaft 32 is mounted, and to which shaft the cultivator beams 33 are pivotally connected. These rear cultivator gangs are controlled by levers 35 connected to the quadrants 36, said levers having arms 37 connected to the beams 33 and actuate the latter through the tension links 38 upon movement of the levers. On the platform 40 I mount standards 41, which support a rock-shaft 42, to which an arm 43 is rigidly connected and in turn is fastened to support 31 through a tension-link 44.

Figure 5:
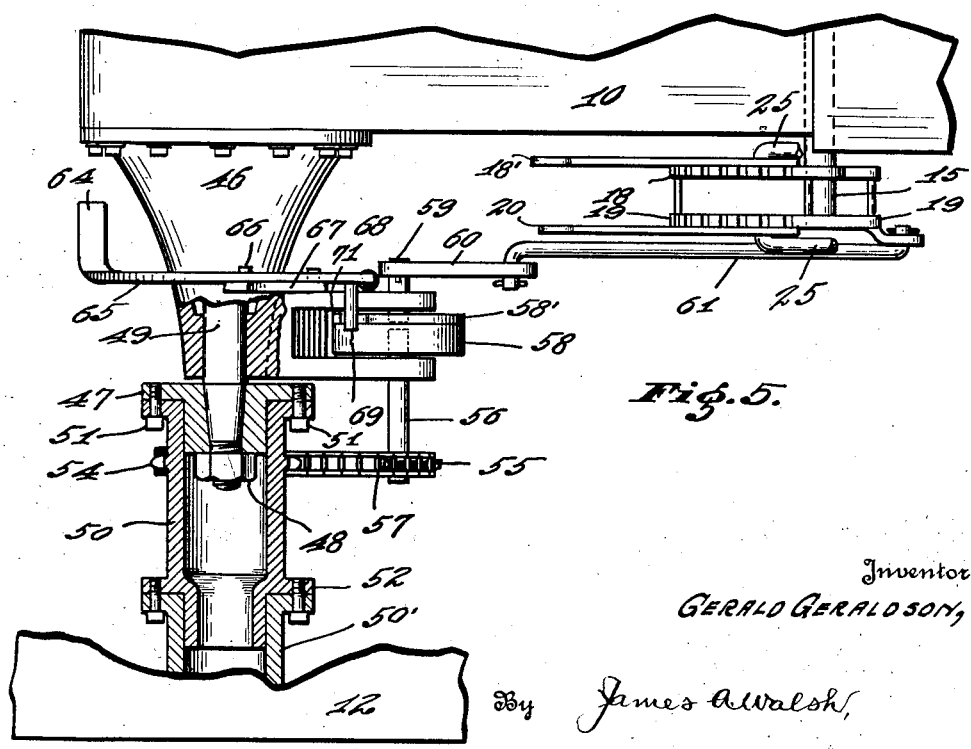

It will be noted, Figs. 4 and 5, that the axle housing 46 is provided with a flange 47 secured in relation thereto by a nut 48 on the axle 49, and upon which flange I mount an extension hub 50 by bolts 51, the external portion of the outer end 52 of said hub being the exact dimension of the external portion of the flange, for purposes to appear. About the periphery of hub 50, and preferably formed integrally therewith, I provide a sprocket 54, which is connected to a sprocket 55 on shaft 56 by a chain 57 and which drives sprocket 55 when the rear tractor wheels revolve, said shaft 56 being connected to a member of clutch 58 of the plow-clutch type of a well known character and need not be further specifically described herein. The opposing member of the clutch 58' is mounted on a shaft 59 terminating in a crank 60 which is connected by a link 61 to the lower part of the master quadrant 19. As indicated, the quadrants 16, 17, 18, 19, together with shaft 15, Fig. 3, constitute a unitary assemblage so mounted on the tractor frame as to be free to oscillate as one complete unit. While I have for illustrative purposes shown and described power actuating means connected to the tractor for operating the gangs I do not desire to be understood as limiting myself to such specific construction, as other means associated with a tractor for delivering power for such purpose may be employed.

Near the upper end of the master quadrant 19 I secure a link 62, its rear end being connected to the arm 43, and it will thus be seen that the master quadrant is in connection with the forward gangs through the link 25 and also with the rear gangs through the link 62.

When the tractor is to be turned and it is desired to lift the cultivator gangs it is unnecessary to stop the tractor, as the gangs may be readily lifted simultaneously by the operator kicking or thrusting his foot against the end 64 of lever 65, which is pivoted at 66 to a support 67, its opposite end yieldingly connected to the tractor by a spring 68, which action by the operator disengages the stop 69 from clutch ear 70, whereupon the sprocket-and-chain system described turns a clutch member one-half revolution until its opposite ear 71 engages stop 69, which movement carries the crank 60 the same distance so that said crank will pull link 61 connected to quadrant 19 until the clutch members become disengaged, with the effect of pushing its gang-controlling link 25, and, through shaft 15, the links 21, 23, 24, to swing gangs a, b, c, d, upwardly and lifting the cultivators carried thereby from the ground, while simultaneously with such action the link 62 connecting said quadrant and the arm 43 rocks the shaft 42 to raise the rear gangs 33, in which manner the entire complement of gangs fore and aft are raised to clear the ground to permit the tractor to freely turn without intervention from the cultivators. To return the gangs to lowermost position as indicated in Fig. 2, lever 65 is disengaged from clutch-ear 71 in the manner stated, whereupon through the action of the sprocket-and-chain system associated therewith the clutch member is revolved a half turn until its ear 70 is again engaged by stop 69, during which operation the quadrant 19 is moved in reverse direction, which pulls the link 25 rearwardly, as also links 21, 23, 24, through shaft 15, to lower the forward gangs, and at the same time pushes link 62 rearwardly to lower the rear gangs, in which position the members of clutch 58 are disengaged, and the sprocket-and-chain system runs idly until the clutch members are being again engaged by actuating lever 65 in the manner stated.

As modern tractors exert high power it is economical to utilize such power to the limit, and in carrying out my improvement I provide for the modification in width between the rear wheels so that a tractor may be applied to four rows as indicated in Fig. 1, and which area such type of tractor is capable of cultivating with my improved appliances. To increase or decrease the tread of the rear wheels I employ the means shown in Fig. 5, the arrangement illustrated providing for increasing the width. However, when it is desired to use the tractor in the ordinary way for different purposes such as plowing, harvesting, road building and the like, I reduce the same to normal width by removing extension hub 50 and applying the wheel-hub 50' to flange 47, then securing the same to the flange by the bolts 51, and in which manner, as will be understood, the tractor may be readily converted to narrower or wider tread for the purposes stated.

While I have particularly described and claimed my improvements as applied to cultivators, I desire it to be understood that as other implements such as planters, listers and the like are equipped with tools adapted for their especial work, requiring adjustability in relation to the ground substantially similar to cultivators, my invention may be readily adapted to such implements and they may therefore be considered the equivalents of a cultivator, which latter I have chosen to illustrate as a practical example of the application of my improved selective and collective gang-controlling means.

I claim as my invention:

1. The combination, with a tractor, of a cultivating device pivotally mounted at its forward end, a cultivating device mounted at its rear end, a pivoted quadrant intermediate said forward and rear devices, a lever pivotally mounted on the quadrant, a link connecting the lever and forward devices whereby the latter may be adjusted by the lever, a lever for adjusting the rear device, a link connecting the quadrant and rear device, and power actuating means connected with the tractor and with the quadrant for actuating the latter to raise and lower the forward and rear cultivating devices.

2. The combination, with a tractor, of a support at its forward end, cultivating devices pivotally mounted on said support, a support at the rear end of the tractor, cultivating devices on the rear support, a rock-shaft positioned on the tractor, quadrants on the rock-shaft for controlling each of the forward cultivating devices, a lever connected to each of the quadrants, a link connecting each lever with one of said forward cultivating devices whereby the devices may be independently adjusted, means for independently adjusting each of the rear cultivating devices, a link connecting the rear devices to one of the quadrants, and means actuated by the tractor and connected to the latter quadrant for actuating it to simultaneously raise and lower said forward and rear cultivating devices.

3. The combination, with a tractor, of a plurality of cultivator gangs pivotally mounted at the forward end thereof, a rock-shaft, quadrants on the rock-shaft said quadrants including a master quadrant, levers pivotally mounted on the quadrants, links connecting the gangs to the levers, said gangs beings independently adjustable in a vertical direction by said levers and links, and means on the tractor and connected to the master quadrant for actuating the latter to rock said shaft and simultaneously adjust the gangs.

4. The combination, with a tractor including an axle, of a flange secured to the axle, an extension hub mounted on said flange and embodying a sprocket, a clutch embodying engaging and disengaging members, a shaft supporting one member of said clutch and having a sprocket at its outer end, a chain connecting the extension hub sprocket to the shaft sprocket, a crank shaft connected to the opposite clutch member, a unitary gang cultivator adjusting assembly, and means for connecting the crank-shaft to said assembly for actuating the latter to adjust said plurality of cultivator gangs when said crank-shaft is actuated.

5. The combination, with a tractor including an axle, of a flange secured to the axle, an extension hub mounted on said flange and embodying a sprocket, a clutch embodying engaging and disengaging members, a shaft supporting one member of said clutch and having a sprocket at its outer end, a chain connecting the extension hub sprocket to the shaft sprocket, a crank shaft connected to the opposite clutch member, a unitary gang cultivator adjusting assembly, means for connecting the crank-shaft to said assembly for actuating the latter to adjust said plurality of cultivator gangs when said crank-shaft is actuated, cultivator gangs pivotally mounted at the rear end of the tractor, and means connecting the rear gangs to said unitary structure whereby when the latter is actuated by said sprockets and chain the rear gangs will be simultaneously actuated therewith.

6. In a tractor cultivator, the combination, with a wheel hub thereof, of a sprocket, a clutch embodying engaging and disengaging members, a shaft connected to one of said members, a sprocket on the shaft, a chain connecting said sprockets, a crank-shaft connected to the opposing clutch member, cultivator gangs on the forward end of the tractor, means for adjusting said gangs. means connecting the crank-shaft to said gang adjusting means, and a lever associated with said clutch whereby when the lever is tripped the clutch will be actuated to impart motion to the connecting means for actuating the gang adjusting means to raise and lower the gangs.

7. In a tractor cultivator, the combination, with a wheel hub thereof, of a sprocket, a clutch embodying engaging and disengaging members, a shaft connected to one of said members, a sprocket on the shaft, a chain connecting said sprockets, a crank-shaft connected to the opposing clutch member, cultivator gangs on the forward end of the tractor, means for adjusting said gangs, means connecting the crank-shaft to said gang adjusting means, a lever associated with said clutch whereby when the lever is tripped the clutch will be actuated to impart motion to the connecting means for actuating the gang adjusting means to raise and lower the gangs, cultivator gangs mounted on the rear of the tractor, and means connecting the rear gangs to the forward gang adjusting means whereby the forward and rear gangs will be adjusted simultaneously.

In testimony whereof I affix my signature.

GERALD GERALDSON.